United States Patent Office 3,262,542
Patented July 26, 1966

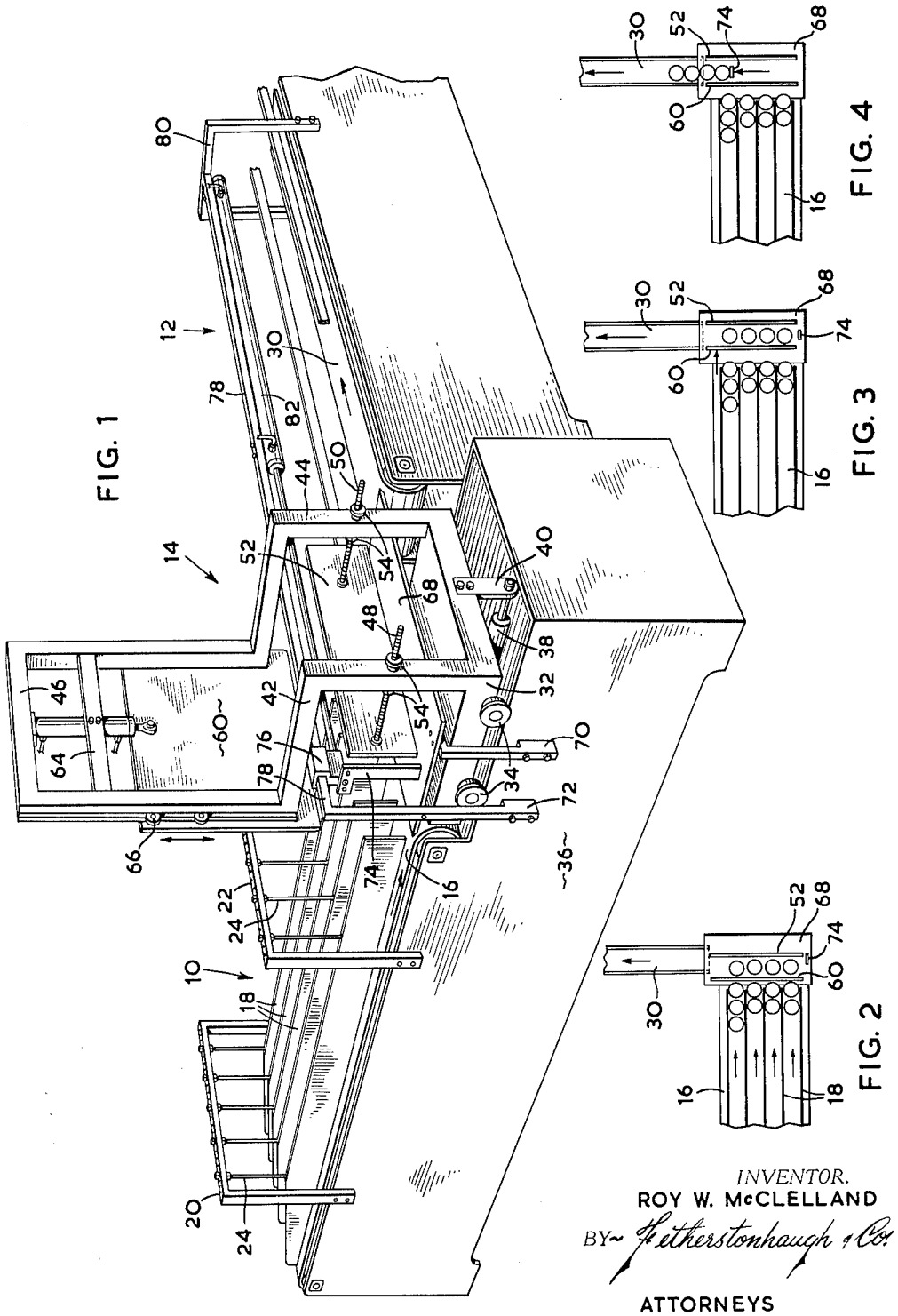

3,262,542
BOTTLE UNSCRAMBLER
Roy Warren McClelland, Meadowvale, Ontario, Canada
Filed Sept. 25, 1964, Ser. No. 399,267
6 Claims. (Cl. 198—32)

This invention relates to the manufacture of packaging equipment and is particularly concerned with an apparatus for receiving empty bottles from cartons and lining them up for delivery to a bottle filling machine. This type of apparatus is generally known in the trade as a bottle unscrambling machine or simply a bottle unscrambler.

As mentioned above, it is the function of a bottle unscrambler to receive bottles from cartons and properly arrange them for efficient delivery to a bottle filling machine. The bottles are normally packed upside down so that as the cartons are opened, the bottles may be deposited right side up on the feeding mechanism of the unscrambler. The bottles are dropped on the feeding mechanism in a block which may take the form of two rows of six bottles each up to twelve rows of a dozen bottles each, depending on the size of the bottles and the manner in which they are packed in the carton. As the feed to a filling machine almost always consists of a single continuous row of bottles, it is the function of the bottle unscrambler to receive the bottles from the cartons and to arrange them in a continuous single row for delivery to a filling machine.

The bottle unscramblers known heretofore have essentially consisted of a first conveyor belt for receiving the bottles from the cartons en masse and a second smaller conveyor belt running transversely to and at one end of the first conveyor belt so that the second belt picks up each row of bottles delivered by the first belt. While this arrangement will satisfactorily unscramble round bottles, difficulties are encountered with odd-shaped bottles such as those which are square, rectangular or triangular in cross-section. For example, a prior machine set up to unscramble rectangular bottles with the long axes of the bottles oriented parallel to the centre line of the second belt must deliver each of the bottles onto the second belt properly so oriented or moments will be set up causing improperly oriented bottles to rotate which will often cause these bottles to fall over. As a result, the prior machines have been noted for causing an undue amount of bottle breakage. A further disadvantage of the prior machines is that the various moving parts are mechanically actuated, with the result that when bottles within the machine get out of line, there is little resiliency within the machine and this fact itself causes considerable bottle breakage.

It is, therefore, a prime object of this invention to provide a bottle unscrambler which is capable of handling odd-shaped bottles.

It is a more specific object of the invention to provide a bottle unscrambler which will cause less breakage than the unscramblers known heretofore.

It is a still further object of the invention to provide a bottle unscrambler which operates pneumatically as distinct from the unscramblers presently available in which the moving parts are mechanically actuated.

These and other objects of the invention will be more thoroughly understood from the following description of a preferred embodiment thereof as read in conjunction with the accompanying drawings.

In the drawings,

FIG. 1 is a perspective view of a bottle unscrambler in accord with this embodiment; and FIGS. 2, 3 and 4 are perspective top views of a portion of the machine shown in FIG. 1 and illustrating certain steps in the operation of the machine.

As can be seen in the drawings, the machine includes a first conveyor belt mechanism 10, a second conveyor belt mechanism 12, and a transfer mechanism 14 for receiving bottles, cans and the like from the first belt and placing them on the second belt.

The first conveyor belt mechanism 10 has the same basic construction as similar assemblies employed in bottle unscramblers known heretofore, apart from the fact that it is pneumatically operated. It includes a continuous belt 16 extending over a pair of spaced rollers, at least one of which is driven as to cause the upper reach of the belt to move towards the transfer mechanism 14. Belt 16 is preferably constructed of wire mesh or the like as to permit broken glass and other debris from the cartons to fall through the belt. Positioned above the belt, there is a plurality of longitudinally extending dividers 18 which are suspended from a pair of upstanding brackets 20 and 22 by suspension rods 24. The upper ends of rods 24 are adapted to be moved as to permit adjustment of the spacing between dividers 18. The dividers are positioned according to the type of bottles being run through the machine. As illustrated, the dividers are arranged to guide four rows of bottles. More or less dividers can be installed over belt 16 as required. As mentioned above, conveyor belt mechanism 10 is substantially similar to mechanisms previously employed on unscramblers known heretofore. By the same token, conveyor belt mechanism 12 is of known construction and simply consists of a continuous belt 30 arranged to lead bottles away from the transfer mechanism 14 in a single row.

The transfer mechanism 14 includes a movable carriage 32 having a number of wheels 34 arranged to roll on the upper edges of bed frame 36. Carriage 32 is caused to reciprocate back and forth through the actuation of an air cylinder 38 fixed at its inner end to the bed frame 36 and to its outer end to a bracket 40 fixed to the carriage. Extending upwardly from the carriage are a pair of stepped frame members 42 and 44 joined together at the top by a cross member 46. Extending inwardly from frame members 42 and 44 are a pair of threaded rods 48 and 50 which carry at their inner ends a stop plate 52 which is adjustable towards and away from frame members 42 and 44 by the adjusting nuts 54 on the rods 48 and 50.

The frame members 42 and 44 of carriage 32 also carry a guillotine plate 60 which is capable of vertical reciprocation. Plate 60 is caused to reciprocate by an air cylinder 62 fixed at its upper end to cross member 46 of the carriage frame and further supported by a structural plate 64. Guillotine plate 60 carries a number of rollers 66 which engage vertical grooves in the sides of frame members 42 and 44.

Another component of transfer mechanism 14 is a base plate 68 which is suported at the level of the top surfaces of belts 16 and 30 by a pair of brackets 70 and 72 fixed to bed frame 36. The final component of the transfer mechanism is a hoe 74 which is adapted for reciprocation above the base plate 68 in a direction transverse to the longitudinal axis of belt 16 and parallel to the longitudinal axis of belt 30. Hoe 74 is suspended from a slide 76 which is engaged on and adapted to slide along a rail 78 extending from the upper end of bracket 72 to the upper end of a U-shaped frame member 80 carried by the conveyor belt mechanism 12. Slide 76 and hoe 74 are caused to reciprocate by an air cylinder 82 fixed to the under side of rail 78.

As previously mentioned, transfer mechanism 14 receives rows of bottles from belt 16 and deposits the bottles on belt 30 in a continuous single row. As each row of bottles reaches the end of conveyor belt 16 and moves on to the top surface of base plate 68 by the action of the following rows of bottles, it moves as far as stop plate 52. Conveyor 16 is then stopped automatically and in this regard, it is to be noted that belt 16 is moved in a stepped manner with the amount of movement being pre-set depending upon the size of the bottles being unscrambled.

As the next step in the sequence, guillotine plate 60 is caused to move downwardly as to divide the row of bottles just delivered against the stop plate 52 from the next following row of bottles. Then carriage 32 moves forward as to orient the row of bottles between the guillotine plate and the stop plate with the longitudinal centre line of belt 30. Finally, hoe 74 is caused to move towards belt 30 as to push the bottles onto the belt. The speed of the stroke of hoe 74 is determined by several factors, including the speed of the belt 30 and the size of the bottles involved. It can be appreciated that with smaller bottles, there would be a greater number of spaces between the bottles as they are moved along conveyor belt 16. Since in the normal course, dividers of the same thickness would be used to separate smaller bottles as would be used to separate large bottles, there would be proportionately more total spacing between a row of small bottles than a row of large bottles. Thus, if it were desired to move the bottles onto belt 30 so that they are touching each other, it may be necessary to adjust the speed of the stroke of hoe 74 depending upon the size of the bottles being unscrambled.

In setting up the machine for operation, therefore, the operator must make several adjustments depending upon the size of bottles to be unscrambled. These adjustments include proper arrangement of dividers 18, positioning of stop plate 52, and adjustment of the speed of air cylinders 38 and 82. Apart from these initial adjustments, the machine operates automatically. The use of air cylinders provided with proper relief valves avoids breakage as bottles which get out of place are not crushed by moving components of the machine, whereas with prior machines driven mechanically the percentage of bottle breakage was relatively high. In addition to the expedient of using air cylinders, bottle breakage is largely avoided by the machine in accord with this invention by its efficiency in unscrambling odd-shaped bottles. As the bottles coming off conveyor belt 16 are not pushed on to a moving conveyor belt as was done with the prior machines, there are no moments set up tending to twist the bottles out of alignment and quite often causing them to fall over.

What I claim as my invention is:

1. A bottle unscrambling machine comprising a first horizontal conveyor belt, a second horizontal conveyor belt, the longitudinal axes of said belts extending substantially at right angles to one another, and a transfer mechanism position between the delivery end of said first belt and the pick-up end of said second belt, said transfer mechanism including a fixed horizontal base plate arranged so that its top surface is at substantially the same level of the top surfaces of said conveyor belts, a stop plate positioned above said base plate in a plane which is substantially vertical, transverse to the longitudinal axis of said first conveyor belt and parallel with the longitudinal axis of said second conveyor belt, a guillotine plate adapted for vertical reciprocation above said base plate in a plane substantially parallel with the plane of said stop plate, and a hoe mechanism adapted for reciprocation above said base plate and between the planes of said guillotine and stop plates in a direction substantially transverse to the longitudinal axis of said first conveyor belt and parallel with the longitudinal axis of said second conveyor belt.

2. A machine as claimed in claim 1 in which said stop plate is adjustable with respect to its distance from the delivery end of said first conveyor belt.

3. A machine as claimed in claim 2 including means for automatically shifting said stop and guillotine plates relative to the longitudinal centre line of said second conveyor belt whereby bottles held between said plates may be aligned with said centre line.

4. A bottle unscrambling machine comprising a first horizontal conveyor belt, a second horizontal conveyor belt, the longitudinal axes of said belts extending substantially at right angles to one another, and a transfer mechanism positioned between the delivery end of said first belt and the pick up end of said second belt, said transfer mechanism including a base plate arranged so that its top surface is at substantially the same level of the top surfaces of both said conveyor belts, a carriage mechanism adapted for movement generally parallel with the longitudinal axis of said first belt and generally transverse to the longitudinal axis of said second belt, an adjustable stop plate carried by said carriage and extending generally transverse to the longitudinal axis of the first belt, a guillotine plate carried by said carriage and adapted for vertical reciprocation in a plane generally parallel with the plane of said stop plate, and a hoe adapted for reciprocation towards and away from said second conveyor belt above the top surface of said base plate and between said guillotine and stop plates, said first conveyor belt being adapted to deliver bottles onto the top surface of said base plate, said stop plate and guillotine plate being adapted to align said bottles with the longitudinal axis of said second conveyor belt and said hoe being adapted to push said aligned bottles across the surface of said base plate onto said second conveyor.

5. A machine as claimed in claim 4 including a first air cylinder for effecting reciprocation of said carriage, a second air cylinder, carried by said carriage mechanism, for effecting reciprocation of said guillotine plate and a third air cylinder for effecting reciprocation of said hoe mechanism.

6. A machine as claimed in claim 5 in which said hoe comprises a bottle engaging member which is suspended from a slide member engaged on for sliding movement with a fixed rail positioned above said base plate and lying in a plane including the longitudinal centre line of said second conveyor belt.

References Cited by the Examiner

UNITED STATES PATENTS

| | | | |
|---|---|---|---|
| 2,687,797 | 8/1954 | Hirsch et al. | 198—32 |
| 2,799,414 | 7/1957 | Streckfuss | 198—24 X |

EVON C. BLUNK, *Primary Examiner.*

R. E. KRISHER, *Assistant Examiner.*